(12) United States Patent
Mahadev et al.

(10) Patent No.: US 7,562,435 B2
(45) Date of Patent: Jul. 21, 2009

(54) METHOD TO IMPROVE CROWN SIGMA CONTROL OF THE SLIDER IN A HARD DISK DRIVE

(75) Inventors: Niraj Mahadev, Tracy, CA (US); Yugraj S. Aujla, San Jose, CA (US)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 622 days.

(21) Appl. No.: 11/089,294

(22) Filed: Mar. 24, 2005

(65) Prior Publication Data

US 2006/0215323 A1 Sep. 28, 2006

(51) Int. Cl.
*G11B 5/127* (2006.01)
*H04R 31/00* (2006.01)

(52) U.S. Cl. .................. 29/603.12; 29/417; 29/603.03; 29/603.15; 29/603.16; 29/603.18; 156/268; 156/344; 360/230; 360/237.1; 451/5; 451/37; 451/41; 451/53; 451/57

(58) Field of Classification Search ............... 29/417, 29/603.12–603.16, 603.18; 156/268, 344; 360/230–237.1; 451/5, 41, 37, 53, 57
See application file for complete search history.

(56) References Cited

U.S. PATENT DOCUMENTS

| | | | |
|---|---|---|---|
| 5,923,500 A * | 7/1999 | Hagen | 360/245.3 |
| 6,257,959 B1 | 7/2001 | Kobayashi et al. | |
| 6,531,084 B1 * | 3/2003 | Strom et al. | 264/400 |
| 6,627,909 B2 | 9/2003 | Khlif | 250/548 |
| 6,679,762 B2 * | 1/2004 | Fatula et al. | 451/53 |
| 6,829,818 B2 | 12/2004 | Kamigama et al. | |
| 6,831,249 B2 | 12/2004 | Tam et al. | 219/121.85 |
| 6,865,798 B2 * | 3/2005 | Fukuroi | 29/603.07 |
| 6,913,515 B2 * | 7/2005 | Beaucage et al. | 451/7 |
| 6,960,117 B1 * | 11/2005 | Mahadev et al. | 451/37 |
| 2003/0053256 A1 | 3/2003 | Satoh et al. | 360/245.4 |
| 2005/0078416 A1 * | 4/2005 | Shiraishi et al. | 360/245.9 |

FOREIGN PATENT DOCUMENTS

| | | |
|---|---|---|
| CN | 1254922 | 5/2000 |
| CN | 1345032 | 4/2002 |
| CN | 200610068006.8 | 2/2009 |

* cited by examiner

*Primary Examiner*—Paul D Kim
(74) *Attorney, Agent, or Firm*—Saile Ackerman LLC; Stephen B. Ackerman

(57) ABSTRACT

The sensitivity of the ABS shape of a suspension mounted slider to temperature variations can be greatly reduced if the backside of the slider is lapped to a smooth convex contour that is similar to the ABS shape, rather than to a planar shape, prior to mounting the slider on the suspension. When the backside surfaces of sliders are shaped in this manner, the size of changes in the crown height of the ABS shape due to temperature variations are greatly reduced and the ABS shapes are distributed more tightly, thereby increasing disk drive reliability.

6 Claims, 3 Drawing Sheets

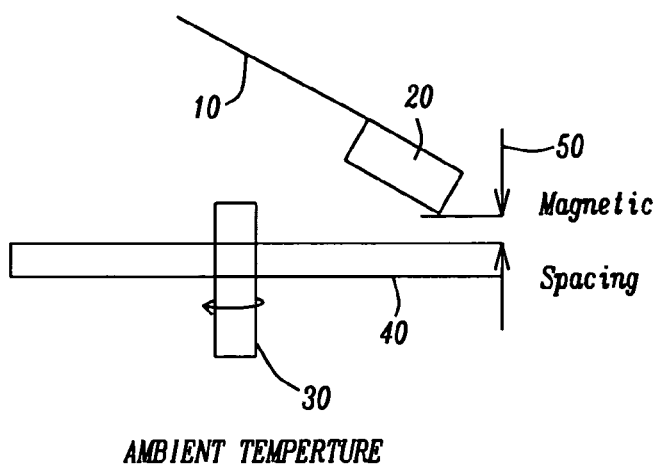
AMBIENT TEMPERTURE
*FIG. 1 - Prior Art*
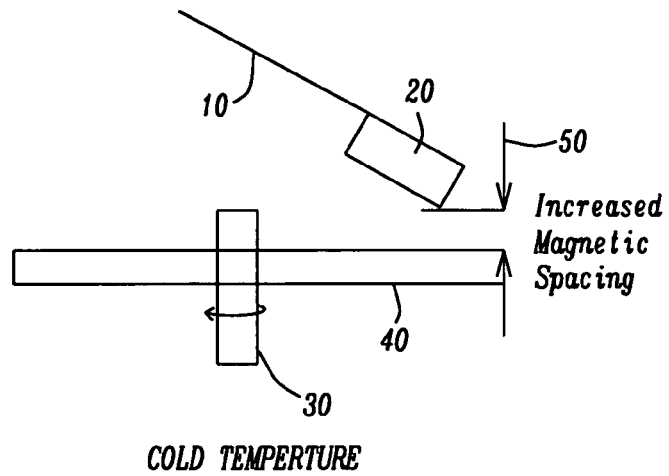
COLD TEMPERATURE
*FIG. 2 - Prior Art*
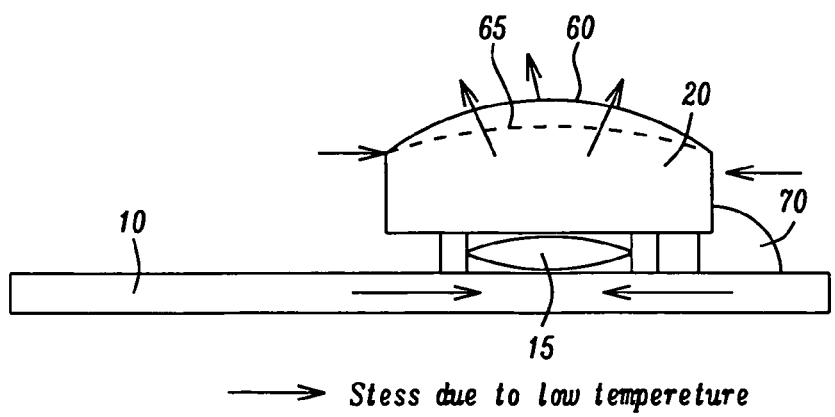
→ Stess due to low tempereture
*FIG. 3 - Prior Art*

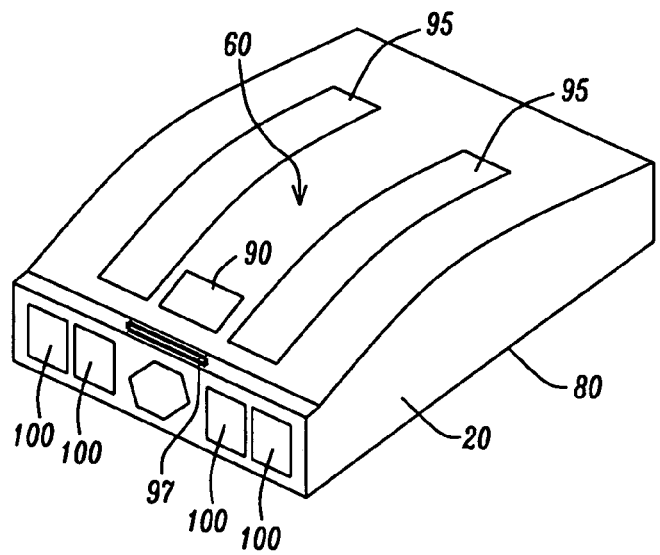
FIG. 4 – Prior Art
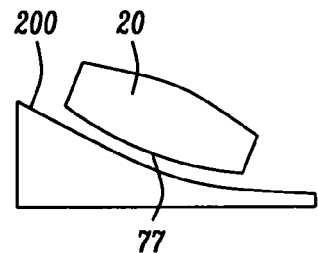
FIG. 5
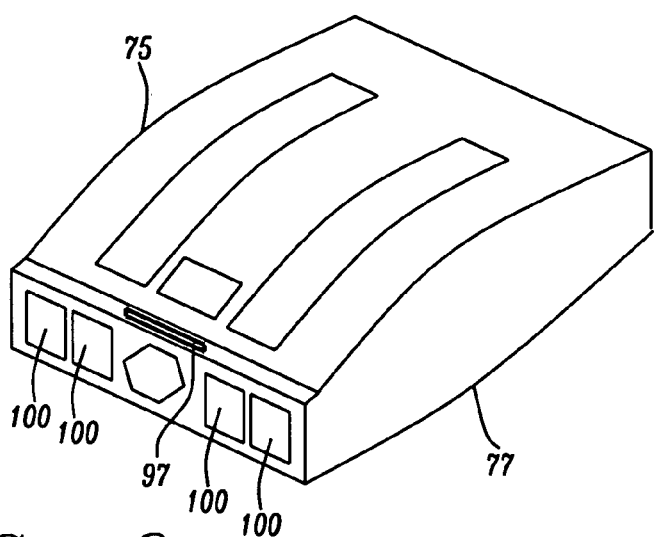
FIG. 6

US 7,562,435 B2

METHOD TO IMPROVE CROWN SIGMA CONTROL OF THE SLIDER IN A HARD DISK DRIVE

BACKGROUND OF THE INVENTION

1. Field of the Invention

This invention relates to the fabrication of hard disk drives (HDD), particularly to a method of controlling slider fly height by improving control of the air-bearing surface (ABS) shape profile during HDD fabrication.

2. Description of the Related Art

With the introduction of the hard disk drive (HDD) in a wide range of consumer applications, there has been a constant shrinkage in its form factor. This shrinkage has ultimately affected all components of the drive. In particular, the read/write head and its slider assembly has also shrunk several orders of magnitude, which has led to the appearance of certain reliability issues that seriously affect the slider/drive manufacturer. Along with the shrinkage in the drives, there has also been an increased capability for the storage of information.

Traditionally, the direction taken in trying to achieve this high density information storage has been to decrease the magnetic spacing between the disk and the slider. FIG. 1 is a schematic illustration showing a suspension-mounted slider (collectively termed a "head gimbals assembly (HGA)") positioned above a rotating magnetic hard disk during disk-drive operation at ambient operating temperature. The suspension (10) holds the slider (20) at an angle above the surface of the spindle-mounted (30) magnetic disk (40), producing a magnetic spacing (50) between the edge of the slider and the disk. It is noted that FIG. 1 is quite similar to FIG. 1 of Satoh et al. (U.S. Patent Application Publication No. US 2003/0053256) which teaches a slider that is bonded to a suspension by means of a flexure having a resiliently deformable tongue, the purpose being to improve electrical conduction between the head and the associated electrical assemblies and to prevent electrostatic discharge problems.

The present level of information storage on the disk surface necessitates a magnetic spacing on the order of nanometers, which introduces challenges to the manufacturer in terms of maintaining very tight control over slider fly height (the height of the slider above the disk during disk rotation) as well as over the shape profile of the slider surface (the surface of the slider adjacent to the disk surface). Both fly height and shape are parameters that are sensitive to the back-end manufacturing process and they must be very tightly controlled to insure efficient performance of the HDD.

One of the important reliability factors in HDD performance is the ability of the HDD to perform well under low temperature conditions, temperatures that are lower than approximately 10° C. Under such conditions, the slider profile changes significantly (eg. the crown of the slider surface acquires a sharper curvature) due to thermal stresses, causing the head within the slider to fly away from the disk surface and reducing the ability of the head to write onto the disk. This phenomenon is termed "cold over write (COW)." FIG. 2 is essentially the same as FIG. 1, except that the situation of HDD operation is not the normal ambient temperature of FIG. 1, but is a low temperature condition. The increased magnetic spacing (50) reflects the effect of the more sharply curved crown as the slider flies above the rotating disk.

A potentially effective method to reduce or eliminate this effect is to control the change of the slider profile over all operating temperatures. It is to be noted that data writing at higher temperatures (approximately 50° C.) does not pose a significant problem, as the slider profile does not change as much at these higher temperatures.

A possible explanation for the change of slider profile is the difference in the coefficient of thermal expansion (CTE) of the slider (CTE=7.5 ppm) and suspension (CTE=17.5 ppm) within the head gimbals assembly (HGA). These coefficient differences could give rise to stresses that develop in the HGA during temperature variations and are transferred to the slider body. Once these stresses appear in the slider, the profile of the slider's ABS will be changed, as indicated in FIG. 3.

FIG. 3 is a schematic illustration of the stresses (arrows) formed at low temperatures within a slider (20), mounted on a suspension (10) by a visco-elastic adhesive (25) and contacted by an electrical connection (70). The compressive stresses on the slider (inward directed arrows), resulting from differences in the coefficient of thermal expansion of the slider material and the suspension material, while the slider is fastened to the suspension by adhesive (15) and contacted by an electrical connection (70), cause the crown (curved region of maximum height) of the ABS surface (60) to curve more sharply than it does at normal operating temperatures (shown as dashed curve (65)). The increased curvature, in turn, increases the magnetic spacing between the slider and the disk and produces the COW condition.

Reducing the sensitivity of the slider profile to temperature-induced changes can be done at the wafer level (before individual sliders are formed). At this level, the slider can be re-designed and wafer materials could be developed that are less sensitive to temperature variations. This would be an expensive solution to the problem. Another solution, possibly equally expensive and time consuming, would be to re-design the suspension and adhesive materials to better accommodate thermal stresses. While these approaches are feasible, they require extensive time and monetary costs.

The need to produce and control slider ABS surface curvature is recognized in the prior art. Tam et al. (U.S. Pat. No. 6,831,249 B2) teaches a method and apparatus for producing very high crown and camber curvature in sliders by application of a pulsed laser beam to the flexed surface of the slider in order to produce known stress changes in the surface. The method is designed to produce such stress flexure without the accompanying stress cracks that are associated with similar methods.

Khlif (U.S. Pat. No. 6,627,909 B2) also teaches a method for adjusting the curvature of a slider ABS by means of light-beam induced stresses. The method includes an apparatus for controlling the amount of curvature by scanning the surface with the same light beam that is used to induce the surface stresses.

As will be disclosed below, the method of the present invention achieves the desired stability of the ABS profile by means of a simple modification of the slider fabrication process presently in use by the inventors.

SUMMARY OF THE INVENTION

The first object of the present invention is to provide a method of fabricating an HGA assembly, including a suspension mounted slider, whereby the shape of the ABS slider profile is rendered less sensitive to thermally induced stresses and, in consequence, read and write performance of the magnetic head is not adversely affected by changes in the magnetic spacing between the head and the disk surface.

The second object of the present invention is to provide such a method wherein a tighter control of slider surface profiles as measured by the distribution of crown heights (tighter crown sigma control) is obtained over a wide range of operating temperatures.

The third object of the present invention is to provide such a method whose advantageous results are independent of suspension type, bonding adhesive between slider and suspension and method of electrical connection to the slider.

The objects of this invention will be achieved by a minimal modification of a presently used fabrication process. In this presently used process the back surface of a row bar of sliders having a crowned ABS shape is ground and then lapped to produce a flatness as close as possible to absolute planarity. The two-step planarization process is applied to the slider backside for several reasons, including the removal of residual stress or distortions from prior slicing processes, allowing the maintenance of a constant slider thickness and minimizing twist on the ABS surface.

The modification introduced within the present invention includes subjecting slider backside surfaces to a curved contour plate lapping subsequent to an initial backside grinding. This backside surface processing occurs subsequent to the shaping of the slider ABS. Thus, there results a slider row bar (a wafer slice from which a plurality of individual sliders will be produced) that has a convex profile on the backside surface as well as on the ABS, both profiles, in fact, being substantially similar. This profile similarity is a highly advantageous condition for the production of balanced stresses on both slider surfaces. The row bar is then sliced into individual sliders, each one now having the required ABS and backside surface profile already produced within the row bar. Unlike the above cited prior art (Tam and Khlif), which does not address backside shape as a means for reducing ABS shape variations, laser radiation deposition will not be required, nor are optical methods needed to adjust the amount and distribution of such radiation.

The change in slider backside surface profile results in a desired shift of the slider ABS surface profile due to a redistribution of stresses within the entire slider structure. By means of this minor process modification, the thermal sensitivity of the slider is reduced without the necessity of additional design modifications on either the wafer design or suspension design. In addition, the method produces a tighter control on the distribution of slider surface profiles at both ambient and low temperatures.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 1 is a schematic side view of a suspension mounted slider showing the magnetic spacing between the slider and a disk surface during normal operating temperatures.

FIG. 2 is a schematic side view of a suspension mounted slider showing the increased magnetic spacing between the slider and a disk surface during low temperature operating temperatures.

FIG. 3 is a schematic side view of a suspension mounted slider showing stresses induced within the slider as a result of coefficient of thermal expansion differences between the slider and the suspension and showing the consequent change in ABS surface profile at low and normal operating temperatures.

FIG. 4 is a schematic perspective view of a slider showing a curved ABS and a flat backside, formed in accord with processing methods that do not include the method of the present invention.

FIG. 5 is a schematic side view showing the backside surface of a slider being lapped in a curved lapping plate (a contour plate) in accord with the present invention.

FIG. 6 is a perspective drawing of a slider formed in accord with the processes of the present invention. Both ABS and backside surfaces are shaped to a curved profile.

DESCRIPTION OF THE PREFERRED EMBODIMENTS

Figure 7:
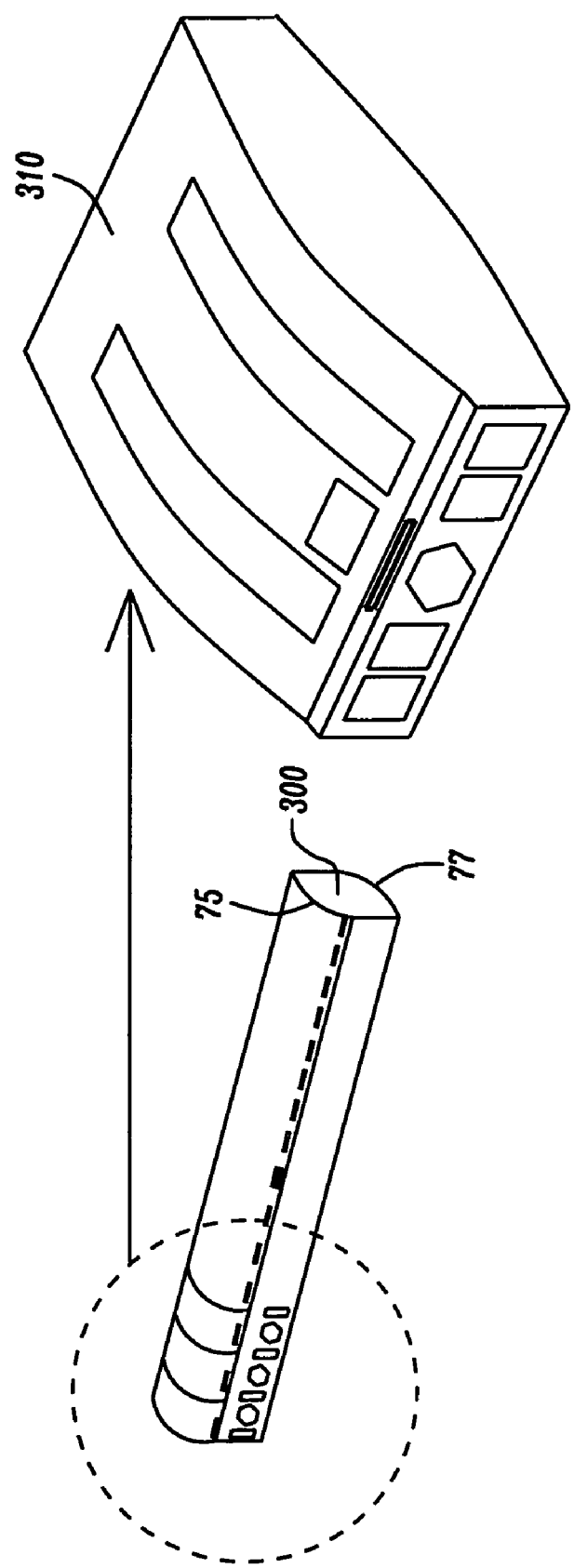
FIG. 7 is a perspective drawing of a row bar, including a plurality of sliders, the entire bar having been shaped in accord with the present invention and the bar being capable of being sliced into individual sliders as also shown in the figure.

The preferred embodiment of the present invention teaches a method of fabricating a suspension mounted slider wherein the variation of the slider ABS profile is minimized and tightly controlled with respect to temperature variations, thereby reducing or eliminating temperature induced magnetic spacing variations between the read and write heads within the slider and the surface of a magnetic disk. The method is simple and requires minimal variations of the standard process used to form such a suspension mounted slider. In particular, the invention requires that the backside surface of the slider (or the row bar from which it is sliced) be lapped to produce a contoured surface rather than to the traditional planar surface. The steps in the process as well as experimental verification of its results will be described below.

Fabrication of a Preferred Embodiment

Referring now to FIG. 4, there is shown a schematic perspective drawing of the slider of FIG. 3, which is not formed in accord with the present invention. The slider backside surface (80) is planar, as a result of grinding and lapping. The ABS pattern (95) and (90) is shown, as well as the read and write heads themselves (97), which are very closely spaced where they intersect the ABS and are indicated as a single line. Connecting tabs (100) for electrically connecting the heads to external circuitry are also indicated. The crown of the slider (arrow (60)) is the curved peak of the surface.

Referring next to FIG. 5, there is shown a schematic side view of a slider (20) (or a slider row bar) having its backside surface (77) lapped on a curved contour plate (200), using a fine diamond slurry to obtain maximal smoothness, in accord with the method of the present invention.

Referring next to FIG. 6, there is shown in schematic perspective view, the slider lapped in FIG. 5. All elements of the slider are identical to the slider of FIG. 4, except that both the ABS (75) and backside (77) surfaces have now been contoured to essentially similar convex shapes (crowned). The slider can be mounted on a suspension as in FIG. 3, wherein the slider is fastened by an adhesive to the suspension and it is contacted by an electrical connection.

Referring now to FIG. 7, there is shown a row bar (300) and an exemplary slider, identical to that shown in FIG. 6) cut out from it (310). The row bar contains a plurality of sliders, three being indicated within the circled region, each of which has a curved ABS (75) and curved backside (77) and each of which will be removed by slicing to form a single slider such as that labeled (310). Within the method of the invention, the backside surface of the entire row bar is contoured to a smooth surface by lapping in a very fine slurry, such as a diamond slurry.

Testing of a Preferred Embodiment

Several advantages of the invention were experimentally tested by using different fabrication methods. For example, it is well known that the type of adhesive used to bond the slider to the suspension as well as the pattern with which the adhesive is applied can play a role in producing both initial and operational variations of crown profile shapes. A significant distribution of crown shapes as a function of temperature could be detrimental to the overall slider performance in terms of COW reliability. In addition, HGA parameters such as glue type, volume, suspension type and the form of the electrical connection to the slider, contribute significantly to the thermal sensitivity of the slider. Thus, it was necessary to observe the effectiveness of the backside surface profile of the slider at a variety of temperatures and under the influence of different HGA parameters.

Two experimental configurations were constructed and observed. Configuration A was a slider having the curved backside surface of the present invention mounted on a suspension coated with a polyimide film to produce an intentional gap between the slider and the suspension. The electrical connection between the slider and the suspension was made using gold balls. A very fine diamond slurry was used to create a smooth contoured backside surface.

Configuration B was a curved backside slider of the present invention mounted on a suspension without a polyimide coating and having no electrical bonding between the slider and the suspension. The two assemblies were sufficiently different to allow a determination of the effect of the backside crowned profile independently of the other HGA characteristics and parameters.

Two additional versions of each configuration were also formed, using a prior art flat backside surface slider as a control.

The experimental configuration was the same for both the configurations of the present invention and for the controls. The experimental configuration consisted of the HGA assembly (A or B), clamped (using spring loaded clamps) to a Peltier device for changing the HGA temperature. The entire configuration was enclosed in a nitrogen filled housing to eliminate moisture condensation at low temperatures. The experimental testing configuration is not depicted herein as it is not material to the fabrication of the preferred embodiment.

The testing procedure can be summarized as follows.
1. Mount HGA to Peltier device and clamp firmly.
2. Take crown/camber measurements at room temperature (22° C.) using an optical interferometer.
3. Cool HGA to 5° C. at a rate of 0.14 C°/sec and stabilize for 5 minutes.
4. Take crown/camber measurements as in step 2.
5. Heat HGA to 55° C. at a rate of 0.14 C°/sec and stabilize for 5 minutes.
6. Cool HGA back to room temperature and take multiple readings to insure that no damage was done.

As a result of these experiments it was determined that the control sliders (flat bottom sliders) have a larger initial distribution in the range of ABS crown heights at room temperature than the curved backside sliders of the present invention. This was observed in both configuration A and B. Therefore, this benefit is obtained as a result of forming both ABS and backside surfaces with a contoured profile, regardless of the HGA configuration parameters such as suspension, adhesive and connections. This is a significant advantage as it will result in a tighter distribution of fly heights and increased reliability of the drives.

The patterns of adhesive used to bond the sliders to the suspensions play a dominant role in the thermal sensitivity of the sliders. To insure that the experimental results were independent of the adhesive pattern, the experiment was repeated with two different patterns (not shown herein). In both cases an improvement of the crown height range distribution was obtained with the sliders of the present invention both at room temperature and at 5° C. It was concluded that the backside shaping offers a significant advantage regardless of the adhesive pattern applied.

Not only was there an improvement in the distribution of the range of crown heights, but the distribution was tighter at 5° C. This will translate into a more reliable disk drive system at low temperatures.

From the results of these observations, it becomes clear that there are several advantages to backside contour lapping of a row bar and of an individual slider.
1. Tighter crown distribution on the HGA at ambient conditions.
2. Improved thermal sensitivity at low temperatures (5° C.).
3. Tighter crown height distribution at low temperatures.

As is understood by a person skilled in the art, the preferred embodiment of the present invention is illustrative of the present invention rather than being limiting of the present invention. Revisions and modifications may be made to methods, processes, materials, structures, and dimensions through which is formed a suspension mounted slider with reduced thermal sensitivity of its ABS shape, while still providing such a suspension mounted slider, formed in accord with the present invention as defined by the appended claims.

What is claimed is:

1. A method of forming suspension mounted sliders whose shapes of an air bearing surface have a more tightly controlled distribution and a reduced thermal sensitivity comprising:

providing a row bar including a plurality of sliders formed therein;

forming a crowned convex shape of the air bearing surface on said row bar; then forming a smooth convex shape of a backside surface opposite to the air bearing surface shape on said row bar; then slicing said row bar to produce individual sliders, the backside surface of each of said sliders having said smooth convex backside surface; and mounting each of said sliders on a separate suspension and forming electrical connections between each of said sliders and said separate suspension on which each of said sliders is mounted.

2. The method of claim 1 wherein said smooth convex backside surface is produced by lapping said row bar in a fine diamond slurry using a contoured lapping plate.

3. The method of claim 1 wherein said convex backside surface is characterized by a crown and is substantially similar to said shape of the air bearing surface.

4. The method of claim 1 wherein each of said sliders is mounted on said separate suspension using a visco-elastic adhesive.

5. The method of claim 1 wherein said electrical connections are formed using gold balls.

6. The method of claim 1 each of wherein said suspension mounted sliders has a reduced sensitivity to thermal variations during a hard disk drive operation as a result of stress redistribution within each of said sliders provided by said smooth convex backside surface.

\* \* \* \* \*